United States Patent [19]
Baty

[11] Patent Number: 5,700,013
[45] Date of Patent: Dec. 23, 1997

[54] SECONDARY SEAL WITH MECHANICAL GAS SEAL

[75] Inventor: John David Baty, Arlington Heights, Ill.

[73] Assignee: John Crane Inc., Morton Grove, Ill.

[21] Appl. No.: 787,436

[22] Filed: Jan. 22, 1997

[51] Int. Cl.[6] ............................................. F16J 15/32
[52] U.S. Cl. ................................................ 277/85; 277/87
[58] Field of Search ............................. 277/81 R, 65, 277/85, 86, 87, 207 R, 205

[56] References Cited

U.S. PATENT DOCUMENTS

| | | | |
|---|---|---|---|
| 3,315,970 | 4/1967 | Holloway | 277/205 |
| 3,592,479 | 7/1971 | Andressen | 277/87 |
| 3,647,227 | 3/1972 | Lojkutz et al. | 277/87 |
| 3,847,389 | 11/1974 | Rogers | 277/205 |
| 3,881,834 | 5/1975 | Bowman | 277/205 |
| 3,897,957 | 8/1975 | Warner | 277/85 |
| 3,947,045 | 3/1976 | Schmidt | 277/87 |
| 4,768,790 | 9/1988 | Netzel et al. | 277/81 R |
| 5,160,149 | 11/1992 | Winn | 277/85 |
| 5,172,918 | 12/1992 | Pecht . | |
| 5,370,403 | 12/1994 | Sedy | 277/85 |
| 5,560,622 | 10/1996 | Sedy | 277/85 |
| 5,639,097 | 6/1997 | Gardner et al. | 277/87 |

OTHER PUBLICATIONS

"Metal Springs Energized Seals Design Handbook", Green, Tweed & Co., Kulpsville, Pennsylvania, 19443–0305, Brochure, p. 4–5.

"Advanced Products EnerSeal Handbook", Advanced Products Co., Inc. North Haven, Connecticut 06473, Brochure, pp. B–1, B–2, C–1, C–2, D–1 through D–4.

"Rotary Variseal Selection Guide", American Variseal Co., Inc. Broomfield, Colorado 80038, Brochure pp. 7–8.

*Primary Examiner*—Scott Cummings
*Attorney, Agent, or Firm*—Dorn, McEachran, Jambor & Keating

[57] ABSTRACT

A secondary seal for use in a high temperature and pressure environment, including only non-elastomeric elements, such as an annular wound spring essentially enclosed on three sides by a polymer cladding. Two lips surround the spring, while permitting an exposed spring section to maintain direct contact with a radial wall surface of a disc which retains the secondary seal disposed annularly around the back face of a seal primary ring. Optional ridges having flat sealing surfaces on one sealing surface of the secondary seal defines a number of discrete annular cells to provide a cascading pressure profile across the sealing surface.

5 Claims, 1 Drawing Sheet

U.S. Patent     Dec. 23, 1997     5,700,013
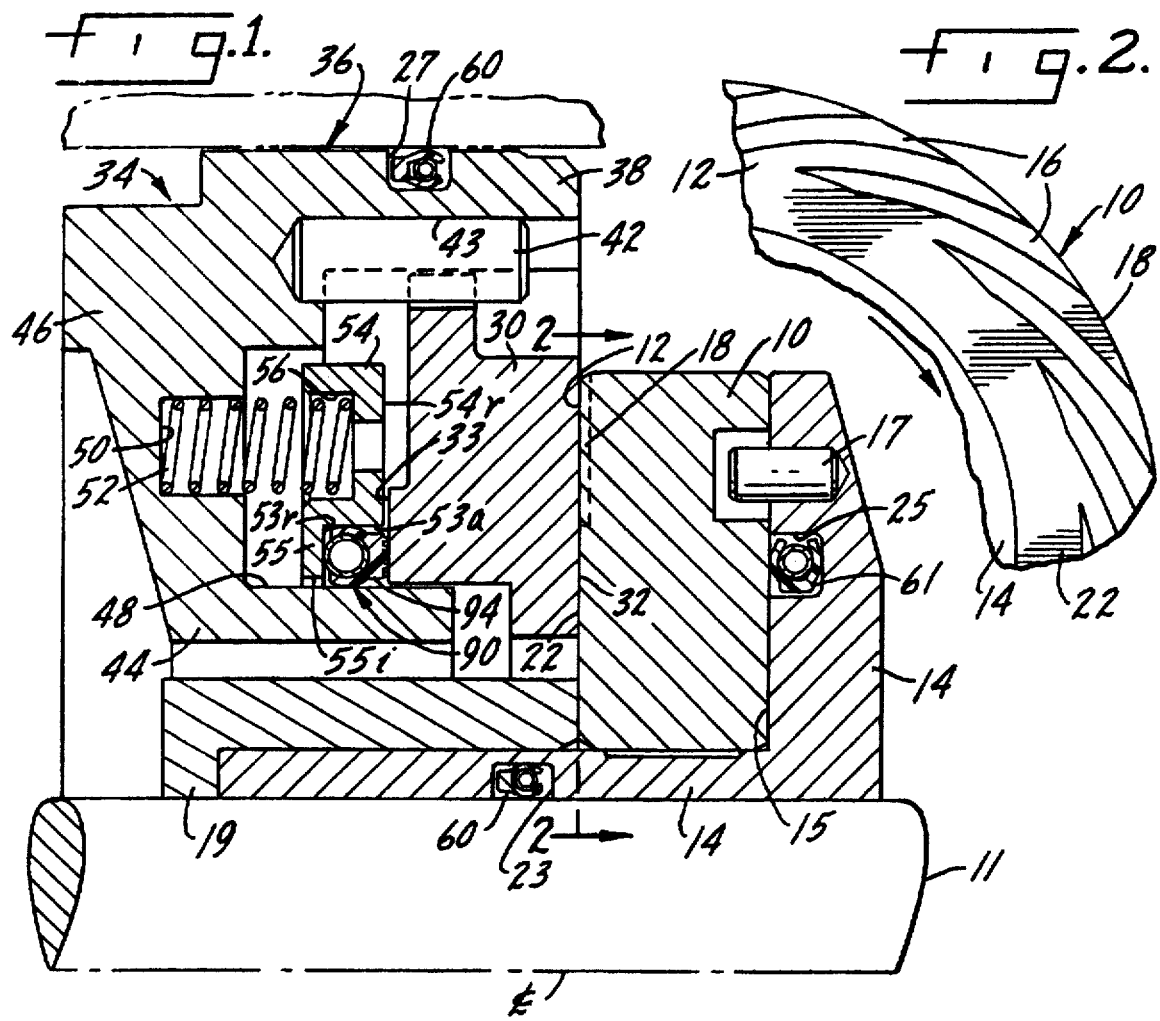
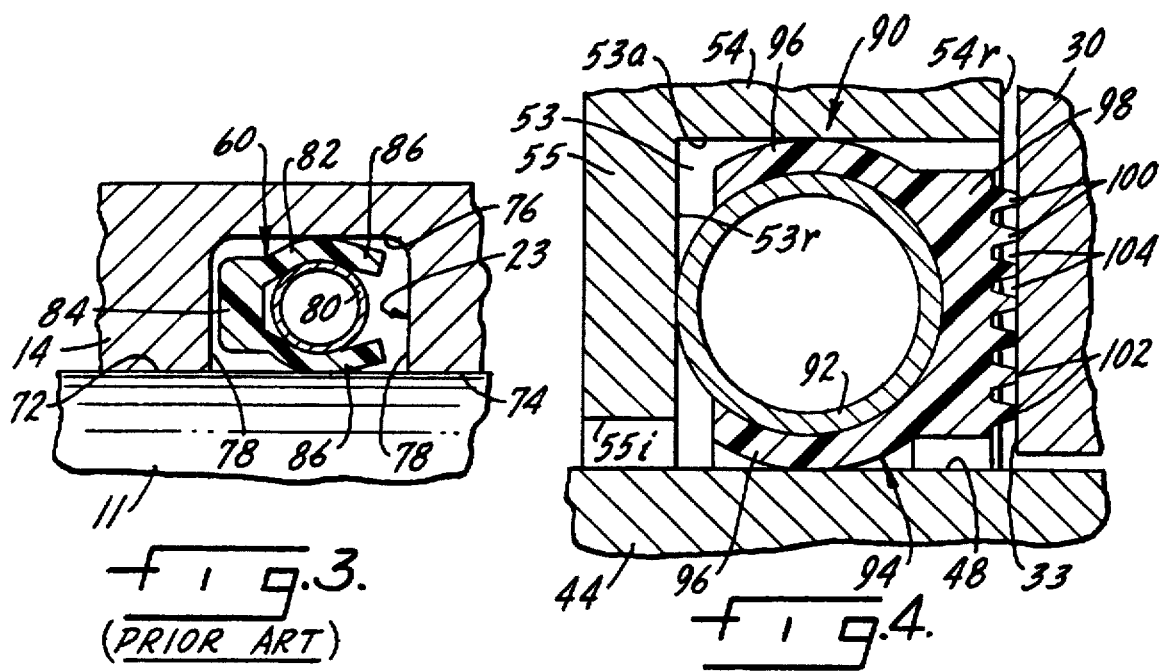

5,700,013

SECONDARY SEAL WITH MECHANICAL GAS SEAL

BACKGROUND OF THE INVENTION

1. Field of the Invention

This invention relates to gas seals and specifically relates to non-elastomeric secondary seals for use in gas seals.

2. Background Art

Gas seals normally operate at great rotational speeds and at higher temperatures and pressures than do contacting seals or seals for sealing liquids. Shafts of typical gas seals run up to rotational speeds of approximately 25,000 RPM. Temperatures are encountered in ranges of up to and over 400° F. Pressures of 300 p.s.i.g. are not uncommon.

Conventional means for sealing the seal rings in high pressure seals, such as elastomeric O-rings, are not suitable because of the tendency of such O-rings to hang up and to undergo explosive decompression. Elastomeric O-rings can not be used to seal each of the rings to the respective shaft or housing because seal ring hang up is caused by unpredictable or inconsistent friction characteristics or by adherence to the sealing diameter of the metallic retainer when resting in the same axial position for an extended period of time. This compromises the seal head's axial translation capability, which sometimes leads to the primary seal hang-up. Hang-up is the failure to close the gap which occurs upon axial translation of the mating ring without the instantaneous or immediate corresponding axial translation of the primary ring.

The possibility of explosive decompression of elastomeric O-rings further limits certain application of secondary seals in a gas process environment. Explosive decompression of an elastomeric O-ring occurs in the event of a sudden loss of gas pressure in a seal. Elastomeric materials, such as VITON, rubber, etc., are porous to gases, and under high gas pressure over extended periods of time will absorb gas within their structure. Upon sudden loss of the high gas pressure, whether due to cessation of shaft rotation in a gas compressor or possible catastrophic failure of some other element of a system, the gas trapped under pressure within the elastomeric structure suddenly expands causing gas bubbles and sudden deterioration of the O-ring structure. Any later attempt to put the seal into service results in the formation of a process gas leakage path in the elastomeric secondary seal O-rings caused by ruptures or other deformities in the O-ring material.

Manufacturers of secondary seals have proposed modification of the construction and utilization of alternate designs in order to solve these problems. For example, Greene, Tweed and Co., of Nottingham, England, U.K., offers for sale seals made under the name MSE Seals; the series 3000 and 5000 Seals provide a composite polymer-metal spring secondary seal which for the most part solves certain of the above-described secondary seal problems. Although these types of seals work well to provide static seals, as will be described below, they are designed to seal between two generally parallel surfaces. The design of the MSE seals is not available for consistent sealing simultaneously along radially extending and axially extending surfaces. It is necessary for a secondary seal to seal against these surfaces simultaneously and such a seal must be usable in an axially movable primary ring application where the secondary seal is subject to axial translation at high speeds.

SUMMARY OF THE INVENTION

This invention is a new and improved secondary seal for mechanical end face seals for sealing high pressure gas. This invention includes a secondary seal for use in a high temperature environment. The mechanical end face assembly seal generally comprises a first seal ring sealed against a rotating shaft and having a generally planar annular first seal ring face and a second seal ring sealed against the housing, the second seal ring having a second seal face being generally planar and opposed to the primary seal ring face and having a generally radially extending back face. One of the rings has spiral grooves extending at least part way across the seal ring face. One of the rings is movable axially of the shaft, or the housing, and the seal assembly further comprises a first biasing means adapted to urge the axially movable seal ring toward the other seal ring to bring the ring seal faces close to one another to have a rotatable sealing engagement relative to one another, a retainer assembly for positioning and orienting the axially movable seal ring generally coaxially of the other ring, the retainer assembly including a retainer and an annularly disposed, radially extending disc having an inner diameter portion defining a notch and further including a secondary seal for providing fluid tight sealing between the axially movable seal ring and on inner diameter portion of the retainer. In a preferred embodiment, the secondary seal comprises a circularly or helically wound annular resilient spring member and a polymer enclosing member having a heel portion and two lip portions, each lip portion being disposed around opposite sides of the annular spring member so as to enclose the annular resilient spring member on three sides while leaving at least an annular portion of the annular resilient spring member exposed for contact with a radial wall of an inner diameter portion of the disc.

BRIEF DESCRIPTION OF THE DRAWINGS

FIG. 1 is a partial cross-sectional view of a mechanical end face seal assembly for sealing a gas according to the present invention;

FIG. 2 is a sectional view taken generally along the plane indicated by lines 2—2 of FIG. 1;

FIG. 3 illustrates in cross-section detail a conventional polymer secondary seal; and FIG. 4 illustrates in detail one of the inventive seal rings of the secondary seal shown in FIG. 1.

DETAILED DESCRIPTION OF THE PREFERRED EMBODIMENTS

Referring now to FIG. 1, there is illustrated the mechanical end face seal comprising a mating ring 10 and a primary ring. FIG. 1 above shows a cross-sectional view of half of a seal arrangement disposed above a shaft 11. It is readily understood that the cross-sectional elements of the seal in FIG. 1 are annular and extend completely around the shaft 11 and centerline CL. The illustration is presented in this way for convenience in accordance with conventional representations of seals; see for example aforementioned U.S. Pat. No. 4,212,475.

The seal mating ring 10 comprises a seal face 12 and a connecting member 14 for connecting the inner diameter portion of the mating ring 10 to a rotating shaft 11. The connecting member may be a sleeve 14 as is partially shown in FIG. 1.

FIG. 2 shows a portion of the seal face 12 of primary ring 10. Face 12 of the mating ring 10 includes a plurality of downward pumping grooves 16 which may be spiral or straight angled, and that extend from the outer circumference partially across the width of face 12. Alternatively, these grooves may be on the primary ring, but for purposes of this description, the face 12 of the mating ring 10 is shown with the grooves 16.

Any two adjacent grooves 16 are separated by a land 18. An annular dam portion 22 having an ungrooved surface is disposed at the inner diameter of the mating ring 10. The ungrooved surface of the cam portion 22 defines a sealing dam which provides a contacting static seal when the seal faces are not rotating relative to each other. The lands 18 and the dam portion 22 are shown at the same height and both are offset relative to the surface of the grooves 16. Grooves 16 may have conventional depth in accordance with known parameters, e.g., as in U.S. Pat. No. 4,212,475, but groove depth is not a distinguishing feature of the present invention.

FIG. 2 shows the mating ring 10 having the spiral grooves 18 exposed at the outer diameter to a higher pressure fluid which is present at the outer diameter of the sealing rings. Alternatively, the higher pressure may be at the inner diameter of the two sealing rings. In such case, modifications would be required in the structure of the mating ring, that is, the grooves would extend from the inner diameter and the annular dam would be disposed at the outer diameter. Either of these designs can operate effectively. A particular design where the grooves extend either from the inner diameter or outer diameter is chosen depending upon the needs of the particular application.

Referring again to FIG. 1, the mating ring 10 is sealed to the shaft 11 through the sleeve 14. That is, a relatively non-rotating, or static, seal is formed between the radially extending back wall of the mating ring 10, opposite the seal face 12 and a radially extending flange wall 15 of a flanged portion of the sleeve 14. As shown in FIG. 1, a drive means comprising a plurality of drive pins 17, extend between corresponding bores on the mating ring back face and the flange-wall 15 so that any rotation by the sleeve 14 necessarily also rotates the mating ring 10. Of course, the sleeve 14 is connected to the shaft 11 by a sleeve drive means, such as the sleeve drive attachment 19. Either the sleeve 14 or the attachment 19, or both, may be attached to the shaft 11 by conventional means, such as set screws (not shown), or by a shoulder or thrust ring connected to the shaft 11, (not shown).

Static stationary seals 60, 61 are also disposed in grooves 23, 25, respectively formed in the radially extending surface flange wall 15 and in the axially extending surface of the sleeve 14 adjacent the shaft 11 which require sealing. To accommodate the applications for which seals of the type illustrated in FIG. 1 are used, the stationary seals 60, 61 comprise the aforementioned polymer seals, such as the EVERSEAL manufactured by Advanced Products Company, Inc. of North Haven Connecticut. Because the elements being sealed are static relative to each other and the stationary seals 60, 61 do not normally transpose position relative to those elements, standard polymer seals 60, 61 can provide the secondary sealing function.

A primary ring 30 is disposed adjacent to and contacting the mating ring 10. The radially extending sealing face 12 of the mating ring 10 presents an annular sealing surface which bears thereon a similarly disposed radially extending sealing surface, also referred to as the seal face 32, of the primary ring 30. Primary ring 30 also comprises a back face 33 which extends radially at least for some radial distance which is disposed oppositely from the seal face 32. Primary ring 30 is connected through a retainer assembly 34 to a housing (shown in phantom in FIG. 1). The primary ring 30 remains stationary during operation of the seal when the shaft 11 is rotating. Mating ring 10 is relatively rotating together with the shaft 11 and during normal operation of a gas seal would be relatively rotating at about 3,000 to about 25,000 RPM relative to the primary ring 30, which is stationary.

The retainer assembly 34 retains the primary ring 30, and further comprises a retainer 36, a secondary seal, a disc and a biasing means. The biasing means axially biases the disc, the secondary seal and the primary ring so that the primary ring seal face 32 is biased against the seal face 12 of the mating ring 10. The retainer assembly 34, is non-rotatably sealingly secured by conventional means (not shown) in the annular cavity defined by a housing (shown partially in phantom) and the shaft 11.

Retainer 36 has an annular outer diameter portion 38 having an inner diameter slightly greater than the outer diameter of the primary ring 30. An annular stationary seal is disposed in a groove 27 located in the outer diameter surface of the retainer 36 and seals that retainer outer diameter surface against a corresponding concentric surface of a housing (shown in phantom). The stationary seal may comprise an O-ring (not shown) or a polymer seal 60, as shown, which will be described in greater detail below.

A suitable drive means such as a pin 42, is inserted into a groove or notch 43 adapted for receiving the pin 42 in the outer diameter portion 38 of the retainer 36. The pin 42, sometimes referred to as a drive pin, engages an outer diameter flanged extension in the primary ring 30 in a conventional manner.

An alternative drive means provides for milling the inner diameter wall surface of the outer diameter portion 38. Producing a "pinless" retainer drive, the method is taught by commonly assigned U.S. Pat. No. 5,199,172. The inner wall surface of outer diameter portion 38 has an inner diameter which provides clearance for the outer diameter of the primary ring 30 and for the other elements of the retainer assembly.

The retainer 36 further comprises an inner diameter portion 44 and a connecting portion 46 which connects the outer diameter portion. 38 and the inner diameter portion 44. The three portions, 38, 44 and 46, of the retainer 36 substantially enclose on three sides the primary ring 30 and the other elements of the retainer assembly 34 in an annular cup shaped enclosure. The inner diameter portion 44 has a cylindrical wall surface 48 which is opposed to the inner wall surface of the outer diameter portion 38, the wall surface defining the inner and outer diameter surfaces of the enclosure for the primary ring 30.

The connecting portion 46 of the retainer assembly 36 includes a plurality of circular bores defining a number of spring seats 50, one of which is shown in FIG. 1. Seats 50 each provide a retaining mechanism for a spring 52. An annular disc 54, also containing a plurality of circular bores defining spring seats 56, is disposed over the springs 52 to compress them, the springs 52 thereby applying an equalized load between seats 50 and 56. Several springs 52 are disposed around the annular connecting portion 46 of the retainer 36 so as to provide a uniform load around the periphery of disc 54. The annular disk 54 preferably is manufactured in accordance with the teaching of commonly assigned U.S. Pat. No. 4,768,790, which is incorporated by reference herein.

The disc 54 further includes a notch 53 adjacent the disc inner diameter section 55, having an inner diameter surface 55$i$. The disc inner diameter 55$i$ is slightly larger than the diameter of the inner retainer portion 44.

Notch 53 is defined by a notch radial surface 53$r$ and a notch axial surface 53$a$. As can be seen, the notch radial surface 53r extends from a point of intersection with the notch axial surface 53a toward the inner diameter surface 55i of the disc inner diameter section 55. Likewise, the notch axial surface 53a extends from the intersection with the notch radial surface 53r to a disc radial surface 54r. As can be appreciated, the notch axial surface 53a extends axially around the centerline CL of shaft 11 at a predetermined radius and also has a predetermined axial dimension. Likewise, the notch radial surface 53r extends in a plane perpendicular to the centerline CL and also has a predetermined radial dimension. The values of these axial and radial dimensions are significant in the practice of the present invention, as will be described below.

The springs 52 which provide the biasing force may comprise any conventional steel ring material, such as spring steel or stainless steel. The disc and the retainer may also comprise steel or other suitable metal.

Referring now to FIGS. 1 and 3, a cross-section of a known polymer stationary seal 60 is illustrated, a detailed stationary seal 60 being illustrated in FIG. 3. The polymer stationary seal generally seals between two surfaces, such as 72, 76. These surfaces may be parts of radially extending walls, such as those of the sleeve flange wall 15 and mating ring back face (FIG. 1) or between the outer annular diameter surface of the retainer 36 and the housing (shown in phantom, FIG. 1) or of axially extending concentric, cylindrical surfaces, such as those between the sleeve 14 and the surface of shaft 11 (FIG. 1). In that respect, the detail cross-section of FIG. 3 is considered to represent any of these stationary seal environments because the stationary seal operates in the same way to provide its sealing function between two surfaces which are essentially parallel and generally stationary relative to each other.

Referring now to FIG. 3, showing in detail the seals representative of the stationary seals 60, 61 (FIG. 1), a first sealing surface 72, whether flat or annular, is directly adjacent a second surface 74 against which a sealing function is required. Groove 23, having appropriate dimensions to receive the polymer stationary seal 60, has a back sealing wall 76 which is essentially parallel with the surface 74. The groove 23 further includes two transversely extending groove walls 78 which provide an effective contour to extend to the back sealing wall 76 to the surface 74.

The stationary polymer seal 60 preferably comprises a two-piece construction where the two pieces are made from different materials. The two part stationary seal 60 comprises annular steel spring 80 that is wound in a ring and joined at its ends at a predetermined diameter. The diameter of the spring 80 is chosen to fit within an annular groove, such as grooves 23, 25, after the appropriate cladding of the second part, a polymer member 82, is wrapped around the spring 80 to form two "lips" 86.

Springs 80 may comprise helically wound springs, or conversely may comprise strips of metal circularly wound and commonly connected to a wire support ring. The helically wound spring may have a tubular cross section of preferably, a helically wound strip. The important feature of the spring is that increasingly progressive resistance arises when any part of the spring is depressed to return the spring to its normal shape.

The polymer member 82 comprises a non-elastomeric material, as set forth above. The material can withstand the higher temperatures which are expected during use of this stationary seal. The polymer member 82 comprises an annular enclosing member for the spring 80, having in cross-section a base 84 and the two annular "lips" 86. The base 84 may also be referenced herein as a heel 84, the two terms being considered synonymous.

The base 84 and lips 86 surround the spring 80 on three sides. The lips 86 have sufficient over extension in the length of the lips such that the spring material does not come into contact with any of the walls of groove 23 under normal use conditions. The lateral thickness of the lips, that is the thickness dimension of the lip cross section taken along a vertical centerline shown in FIG. 3, provides a total dimension together with the outer diameter of the undepressed spring 80, which is slightly larger than the depth of grooves 23, as defined by the difference between surfaces 72 and 76. Predetermined dimensions thus provide spring bias which is exerted on the walls 72 and 76 outwardly from the spring 80 when the surface 74 of the sleeve 14 is brought together with cylindrical surface 72 of the shaft 11. The spring force of spring 80 acts on each of the lips 86 to seal the polymer lips against surfaces 72, 76. Thus, fluid leakage is minimized across the stationary seal 60.

Several advantages derive from the configuration and materials used in the conventional stationary seals 60, 61 described relative to FIGS. 1 and 3. Use of non-elastomeric elements permits the high temperature operation encountered in certain applications. Use of a metal spring material provides a resilient skeletal structure to the sealing material of the polymer 82, which permits direct contact with the metal surfaces, e.g. 72 and 76.

The conventional stationary seals 60, 61 provide adequate secondary sealing between two essentially parallel or concentric surfaces, as shown. A problem arises when attempting to seal against two faces which are not parallel to each other. When using a conventional secondary seal, such as an elastomeric O-ring, this problem does not arise. An O-ring is shaped and dimensioned to be slightly larger than the space into which it is being disposed. Bringing the surrounding surfaces into close contact with the O-ring in the final assembly results in O-ring squeeze, such that the resilient elastomeric O-ring responds to contact by pushing against all the surrounding surfaces and sealing against them. As is set forth above, however, conventional elastomeric O-rings deteriorate when used at high temperatures, thus they cannot be used in such applications. Also, due to the considerations set forth above, conventional polymer stationary seals 60, 61 cannot be used to seal against surfaces which are not parallel to each other.

Referring now to FIGS. 1 and 4, an inventive secondary seal 90 seals between the radially extending back face 33 of the primary ring 30 and the outer diameter cylindrical surface 38 of the retainer inner diameter portion 44. The polymer secondary seal 90 is disposed in the annular notch 53 formed adjacent the inner diameter 55 of the disc 54. The shape and dimensions of the disc 54 and notch 53 are not significant to the present invention. However, the dimensions of notch 53 are of great importance relative to the dimensions of the secondary seal.

Referring again to FIG. 1, and especially to the detail cross section illustrated in FIG. 4, the notch 53 defines an annular space into which the inventive secondary seal 90 is disposed. The annular space has a radial dimension and an axial dimension. Preferably, the axial and radial dimensions of the inventive polymer secondary seal 90 are slightly larger than those of the corresponding axial and radial dimensions of the notch 53.

The secondary seal 90 comprises a two member assembly, a circular spring 92 and an essentially surrounding polymer member 94. The polymer member 94 itself comprises an essentially enclosing cladding, which in cross section is shown as a pair of lips 96 and a base portion or heel 98 extending radially between and joining the lips 96. The substantial thickness of the heel 98 across the radial dimension, relative to thickness of the lips 96, permits the structure to maintain an essential rigidity.

Base portion or heel 98 further comprises a plurality of annular ridges 100, which extend from the opposite side of the heel in a direction away from the spring 92. The ridges 100 may be in the shape of truncated conic sections as shown. The radially extending surfaces 102 of the plural annular ridges 100 are essentially in a plane so that when contacting an opposing planar surface, such as the back face 33 of the primary ring 30, each of the flat truncated surfaces 102 sealingly contact the back surface 33 of the primary ring.

The lips 96 do not extend completely around the spring 92, but are truncated, relative to the lips of seals 60, 61. Lips 96 do not provide the essentially complete enveloping which is evident in the conventional polymer seals 60, 61 (FIG. 3). The requirement of the lips 96 is that the polymer retains the circular spring 92 within the space surrounded by the lips 96, so that when the polymer seal 90 is in use, ejection of the spring 92 from between the lips 96 under the stresses and strains of seal operation is avoided. The lips 96 must also have sufficient length to be able to maintain the seal against the axial surface 48.

The reduced axial dimension of the jacket lips 96 are a significant feature of this invention, because this construction provides an exposed annular section of the circular spring 92 which extends annularly around the complete spring 90. The exposed ring section permits continuous operational contact with an adjacent surface, such as the radial surface 53r of the inner diameter section 55 of the disc 54, as shown. The contact between the surface 53r and the spring section is tangential, and upon compression of the circular spring 92, the radially extending surface 53r exerts a force normal to the spring radius through the spring to axially load the heel 98 and thereby, maintain contact of the surfaces 102 against the back face 33 of the primary ring 30.

FIG. 4 clearly shows the importance of the dimensional tolerances, which permit the matching of the axial and radial dimensions of the spring/polymer seal 90 with those of the notch 53. The polymer seal, in effect, provides a floating contact between the disc 54 around the shaft 11, as taught by U.S. Pat. No. 4,768,790, while simultaneously avoiding contact between the radial surfaces 54r of the disc 54 and the primary ring back face 33. A gap is maintained between these surfaces, at a normally predetermined value to avoid contact between the disc 54 and the back face 33.

The forces acting on the polymer seal 90 cause the spring 92 to retain its circular shape as much as possible, in the form shown in FIG. 4. That is, if some turbulence is encountered in the seal interface, and there is a transitory axial dislocation of the primary ring back face 33, then the back face 33 depresses the polymer seal 90 longitudinally, that is, axially as shown in FIGS. 1 and 4, through the heel 98. This depression causes the transverse sections of spring 92, i.e., the top and bottom sections of the spring 92 which are adjacent the lips 96, to extend outwardly from the center, thus exerting an outward force on the surfaces 98 and 53a. However, since the annular spring 92 will exert essentially an identical force all around the annular notch 53, no radial motion normally results. Instead, since the axial motion of the primary ring 30 cannot be transferred to the axial surfaces 98, 53a, the secondary seal 90 will tend to act axially through the annular exposed section of the spring 92 against the radial surface 53r. This axially directed force will simultaneously cause the radial surface 53r and the disc 54 to be displaced axially away from the back face 33 of the primary ring 30, thereby always maintaining a relatively uniform gap between the back face 33 and the disc radial face 54r.

Any discrepancy in, or significant departure from, the predetermined dimensional tolerances would cause this seal to operate erratically whether because not enough spring force is applied on the heel as to seal the ridges 100 against back face 33 or too much clearance is present between the annular surfaces 53a and 48 of retainer inner diameter section 44. Conversely, if the size of the secondary seal members 92, 94 is too large, then too much friction is created between the polymer lips 96 and the surface 48 to inhibit axial movement of the primary ring 30 and the secondary seal 90 within the retainer 36.

Inhibition of compliance to a sealing interface, referred to as seal hang-up, causes a delayed response by the primary ring 30 to axial movement of the shaft 11 and mating ring 10. During a seal hang-up condition, the mating ring 10 is shifted axially away from the primary ring 30 and an increased gap develops between their respective seal faces 12, 18 which results in unnecessary leakage through the seal. Accurate sizing and deployment of the secondary seal 90 is important both to maintain a secondary sealing capacity and to avoid primary seal ring hang-up.

The thickness of the heel 98 of the secondary seal 90 is also a dimension which should be within a range of values which are not subject to excessive variation from a predetermined range. A heel 98 which is too thin will be unable to adequately and evenly distribute the force of the spring 92 across the radial surface of the heel 98 as it seals against the back face 33 of the primary ring 30. Conversely, a heel that is too thick, i.e., the radial dimension from the spring 92 to the back face 33 is too large, the secondary seal 90 and especially the polymer member 94 becomes overly susceptible to twisting forces in applications in which the gas being sealed achieves higher pressures.

Although a gas at high pressure will provide some axial load on the spring side of the secondary seal 90 so as to exert an axial force pressing on the heel 98, a radial force applied to the outer diameter axially extending surface of heel 98 will also exert an inwardly directed pressure force on the heel 98. The amount of pressure force will be related to the pressure differential between the pressures exerted on the inner and outer diameter surfaces of heel 98. If that pressure differential is sufficiently large, it will cause the polymer member 94 to twist out of position, and the sealing capacity will be impaired. Accordingly, the thickness of the heel 98 may be customized for those applications in which the pressure differential is expected to reach excessive levels.

The sealing capacity between the radial sealing surface of the heel 98 and the primary ring back face 33 is enhanced by the ridges 100. When the secondary seal 90 is properly deployed, each of the annular surfaces 102 of the ridges 100 produce discrete annular cells 104 which each provide a separate seal between the successive radial surfaces 33, 102 to inhibit leakage. Even if some process gas under pressure breaches the first cell 104, successive cells contain the pressure of the gas.

Following some period of adjustment after the process gas develops the high pressure at the process side, and as pressure differentials develop across each of the discrete seals created by surfaces 33, 102, a cascading pressure differential profile may develop. It has been found that such cascading pressure profile provides a better overall seal across the secondary seal 90 because for a high pressure differential, smaller pressure differentials from any one discrete cell 104 to the adjacent downstream cell 104 provide additional sealing capacity. The smaller pressure differentials between adjacent cells 104 inhibit the passage of process gas through the seal from one cell 104 to another. Moreover, even should one sealing surface 102, 33 open up a leakage path to breach one discrete seal to permit leakage to an adjacent cell 104, then subsequent ridges 100 will provide the sealing capacity to maintain the secondary seal at successive discrete cells 104.

Another significant feature of the present invention is the section of the spring 92 which is not covered by the lips 96. This section is on the opposite side of spring 92 from the heel 98, and this provides direct contacting engagement between the radial surface 53r of the inner diameter section 55 of disc 54. Such direct contact allows the essentially complete and instantaneous transfer of the spring force provided by spring 52 to load the primary ring 30.

Conventional assembly of seal retainer 36 usually specifies springs 52 equidistantly spaced around the disc 54. Each spring 52 depresses a section of disc 54 to provide a uniform loading force through the disc 54 and secondary seal 90 on the back face 33 of primary ring 30. As the shaft 11 rotates, transient upset conditions occur which may sometimes cause the primary ring 30 to depart from an aligned condition relative to the plane of the mating ring face 12. When this occurs, the back face 33 of the primary ring may tilt away from the secondary seal 90 at a first angular section, but will also cause it to tilt into the secondary seal 90 at a second, opposite angular section thereof.

As the back face tilts, the spring 92 at the first section of the secondary seal 90 relaxes. The lack of an opposing spring force acting on surface 53r in turn causes the inner diameter section 55 of the disc 54 to be pushed against the spring 92 by the force of an adjacent spring 52 at that angular section, thereby exerting pressure on the secondary seal 90 and maintaining the sealing capacity around the complete annular secondary seal.

Conversely, at the second spring section which is depressed, the spring force of spring 92 produces a reaction force against the radial wall 53r of the inner diameter section 55 of disc 54. This reaction force exerted on radial surfaces 53r tilts the disc 54 until an equilibrium is achieve between the spring forces of springs 52 and annular spring 92. The reaction force on the disc inner diameter section 55 also provides a tilting force to the disc 54, so that the depressed second section 55 cause the tilting of the disc to close the relaxed first section of spring 92.

Because the transient upset conditions causing the primary ring 30 to tilt are usually instantaneous and last only for a split second, it is important that the response time of the equilibrium condition is reached quickly. Also, as soon as the primary ring again reverts to a normal condition, quick response is also necessary to revert the spring force equilibrium to that condition which existed prior to the upset condition.

The direct contact between the spring 92 and the surface 53r enhances the ability of the springs to follow instantaneously the transient upset of the primary back face 33, and thus to maintain the secondary sealing capacity of the seal 90. It is evident that use of a conventional stationary seal, such as seals 60, 61, would impede the instantaneous reaction time of the secondary seal, since the force of the spring 52 would first require transfer through an elastomeric material, such as through the extended lips 86, which would contact the corresponding radial wall.

Modifications and alterations to the structure providing the advantages of this invention may be made by persons of ordinary skill in the art without departing significantly from the teachings found herein. The invention has been described and illustrated herein for purposes of example only, and is not limited to such illustrated embodiments. The invention is considered to be limited only by the following claims and equivalents thereof.

What is claimed is:

1. A secondary seal in a rotary mechanical end face seal for use in a high temperature environment, the rotary end face seal comprising a first seal ring sealed against a rotating shaft and having a generally planar annular first seal ring face with spiral grooves extending at least part way across said first seal ring face and a second seal ring sealed against the housing, the second seal ring having a second seal face being generally planar and opposed to said first seal ring face and having a generally radially extending back face, one of said rings being movable axially of the shaft, said seal further comprising a first biasing means adapted to urge the axially movable seal ring toward the other seal ring to bring said ring seal faces close to one another thereby providing a rotatable sealing engagement relative to one another, a retainer assembly for positioning and orienting said axially movable seal ring generally coaxially of the other ring, the retainer assembly including a retainer and an annularly disposed, radially extending disc having an inner diameter portion defining a notch and further including a secondary seal for providing fluid tight sealing between said axially movable seal ring and an inner diameter portion of said retainer, said secondary seal comprising an annular resilient spring member and a polymer enclosing member, said polymer enclosing member having a heel portion and two lip portions disposed around said annular spring member so as to enclose said annular resilient spring member on three sides while leaving at least an annular portion of said annular resilient spring member exposed for contact with a radial wall of an inner diameter portion of said disc.

2. The secondary seal according to claim 1 wherein said polymer member heel portion further comprises a radially extending sealing wall opposed to the back face of said second ring for sealing thereagainst.

3. The secondary seal according to claim 2 wherein said secondary seal is laterally disposed within said notch of said disc, said exposed portion of said spring member contacting a radially extending wall of said inner diameter portion of said disc at least partially defining said notch and said heel portion radially extending sealing wall sealingly contacting said second ring back face.

4. The secondary seal according to claim 3 wherein said heel portion, radially extending sealing wall further comprises a plurality of raised annular ridges in the shapes of annular cones.

5. The secondary seal according to claim 4 wherein said plurality of raised annular ridges each further comprise a radial wall sealing surface which when brought into contact with said second ring back face, provides for a series of individually sealed annular cells.

* * * * *